United States Patent
Tak

(10) Patent No.: US 8,403,210 B2
(45) Date of Patent: Mar. 26, 2013

(54) INSTALLATION-FREE CHIP CARD READER FOR SECURE ONLINE BANKING

(75) Inventor: Markus Tak, Birkenau (DE)

(73) Assignee: Kobil Systems GmbH (DE)

( * ) Notice: Subject to any disclaimer, the term of this patent is extended or adjusted under 35 U.S.C. 154(b) by 57 days.

(21) Appl. No.: 12/189,174

(22) Filed: Aug. 10, 2008

(65) Prior Publication Data

US 2009/0044268 A1 Feb. 12, 2009

(30) Foreign Application Priority Data

Aug. 9, 2007 (DE) .......................... 10 2007 037 715

(51) Int. Cl.
*G06K 5/00* (2006.01)
(52) U.S. Cl. ......... 235/380; 235/379; 235/381; 235/382
(58) Field of Classification Search .................. 235/441, 235/486, 451, 487, 492, 375–383
See application file for complete search history.

(56) References Cited

U.S. PATENT DOCUMENTS

| | | | |
|---|---|---|---|
| 6,598,031 B1 * | 7/2003 | Ice | 705/50 |
| 6,598,032 B1 * | 7/2003 | Challener et al. | 705/72 |
| 7,815,106 B1 * | 10/2010 | McConnell | 235/380 |
| 2003/0009382 A1 * | 1/2003 | D'Arbeloff et al. | 705/17 |
| 2004/0000593 A1 * | 1/2004 | Sekiya | 235/492 |
| 2006/0064391 A1 * | 3/2006 | Petrov et al. | 705/65 |
| 2007/0005685 A1 * | 1/2007 | Chau et al. | 709/203 |
| 2007/0045417 A1 | 3/2007 | Tsai et al. | |
| 2007/0228164 A1 * | 10/2007 | Lu et al. | 235/441 |
| 2007/0288681 A1 * | 12/2007 | Lee et al. | 710/315 |
| 2008/0141284 A1 | 6/2008 | Tomizu | |
| 2012/0084211 A1 * | 4/2012 | Petrov et al. | 705/64 |

FOREIGN PATENT DOCUMENTS

| | | |
|---|---|---|
| DE | 20 2007 002 971 U1 | 7/2007 |
| EP | 1325465 B1 | 7/2005 |
| WO | 02065317 | 8/2002 |
| WO | 2005109217 A1 | 11/2005 |

OTHER PUBLICATIONS

Guido Braccini, "EP Application No. 08 01 3427 Search Report", Feb. 23, 2009, Publisher: EPO, Published in: EP.
Dipl. -Ing. Weibenger, "DE Application No. 10 2007 037 715.2 Office Action", Aug. 19, 2009, Publisher: Deutsches Patent -und Markenamt, Published in: DE.

* cited by examiner

*Primary Examiner* — Tuyen K Vo
(74) *Attorney, Agent, or Firm* — Kaplan Breyer Schwarz & Ottesen, LLP

(57) ABSTRACT

In order to use a mobile smartcard reader that can address commercial smartcards conforming to the EMV standard in a simple manner, the invention provides a method for controlling a chip card reader (3) by a computer system (4) connectable to smartcard reader (3), comprising the connection of chip card reader (3) to computer system (4) via an interface (8) designed for data communication on the basis of a protocol provided on a standard basis in operating system (11) of computer system (4); the provision of a control program (7a, 7b) for controlling the functions of chip card reader (3), wherein control program (7a, 7b) is provided as a plug-in; and the controlling of chip card reader (3) by executing control program (7b) on computer system (4). The invention further provides a chip card reader (3) as well as a control program (7a, 7b) for performing the method.

8 Claims, 2 Drawing Sheets

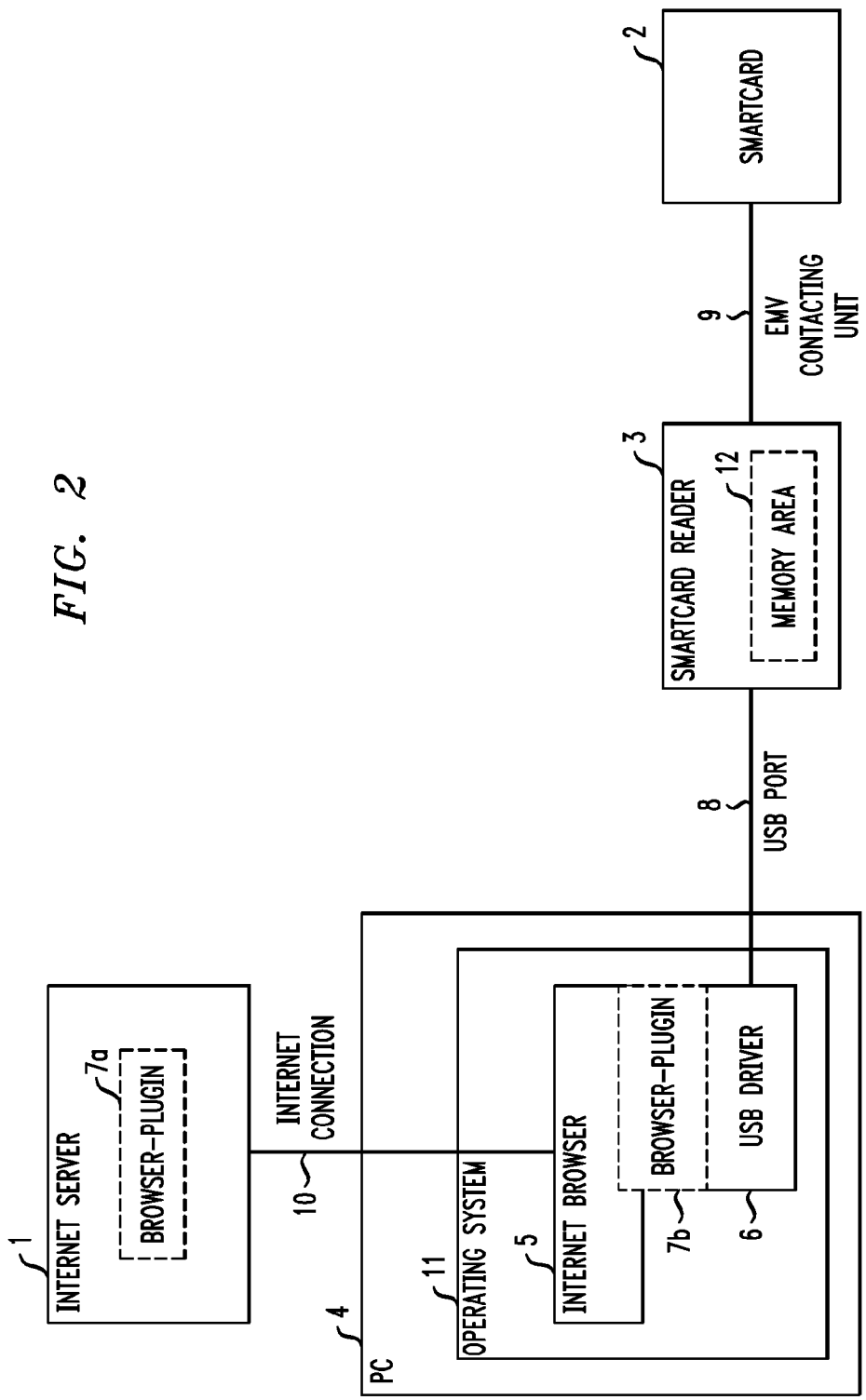

INSTALLATION-FREE CHIP CARD READER FOR SECURE ONLINE BANKING

The invention describes a mobile smartcard reader, which can address ordinary commercial smartcards conforming to the EMV standard [1] (not part of the invention). The EMV standard is described in the specifications published by the firm EMVCo. LLC (EMV™ Integrated Circuit Card Specifications for Payment Systems Version 4.0, EMVCo LLC, 2000; http://www.emvco.org). The particular invention is that no driver software of any kind need be installed for the mobile smartcard reader in order to use it in the Internet for secure user authentication and authorization of transactions, as well as for data encryption. For this purpose, a so-called "browser plug-in" is used, which is downloaded one time from an Internet server (not part of the invention) and installed in the local Internet browser (not part of the invention). This browser plug-in provides the connection between the mobile smartcard reader (the invention) via the existing USB driver (not part of the invention) and the Internet server.

The scope of the invention is thus the browser plug-in (7a/b) and the smartcard reader (3), which presents itself due to its implementation at the USB port (8) such that it is recognized and incorporated by ordinary commercial operating systems, without a manufacturer-specific driver having to be installed.

Fields of Application:
- Internet banking/bank transactions (also securities, account management, etc.)
  - Secure log-in at the Internet banking server (identification of the user)
  - Digital signatures for transactions
- Secure log in at Internet portals/protected contents
  - Authentication of the user Possible Implementations:
- Internet browser: Internet Explorer, Mozilla Firefox, etc.
- Operating system: Microsoft Windows, Linux, Apple MacOS, etc.
- Smartcard: EMV chip cards, crypto chip cards, signature chip cards, PKI chip cards—each with the identity of the user (as a pseudonym if desired), wherein cryptographic keys and/or algorithms necessary for signature or authentication can also be stored on the respective chip card.
- USB driver: Human Interface Device (HID)

HID (see http://www.usb.org/developers/hidpage/) designates a device class of the USB standard for computers, which describes devices that interact directly with the user. HID device drivers are contained in common operating systems.

Differentiation from Known Technology:
- USB token with soldered-on crypto chip (Aladdin, U.S. Pat. No. 6,763,399 B2)
  - Smartcard is interchangeable, thereby very different personalization/association with the user is possible
  - No necessity for driver installation, runs on all commercial operating systems
- smartcard (storage for key material)
  - Is not part of this invention, but rather it is only used together with the invention
- chip card readers
  - Today always require the installation of manufacturer-specific and operating system-specific drivers
- Telekom patent (memory+smartcard)
  - No memory on the chip card reader
  - Smartcard is interchangeable and separate from the device of the invention

BRIEF DESCRIPTION OF THE DRAWINGS

FIG. 2 depicts a system that comprises smartcard reader 3.

DETAILED DESCRIPTION

Figure 1:
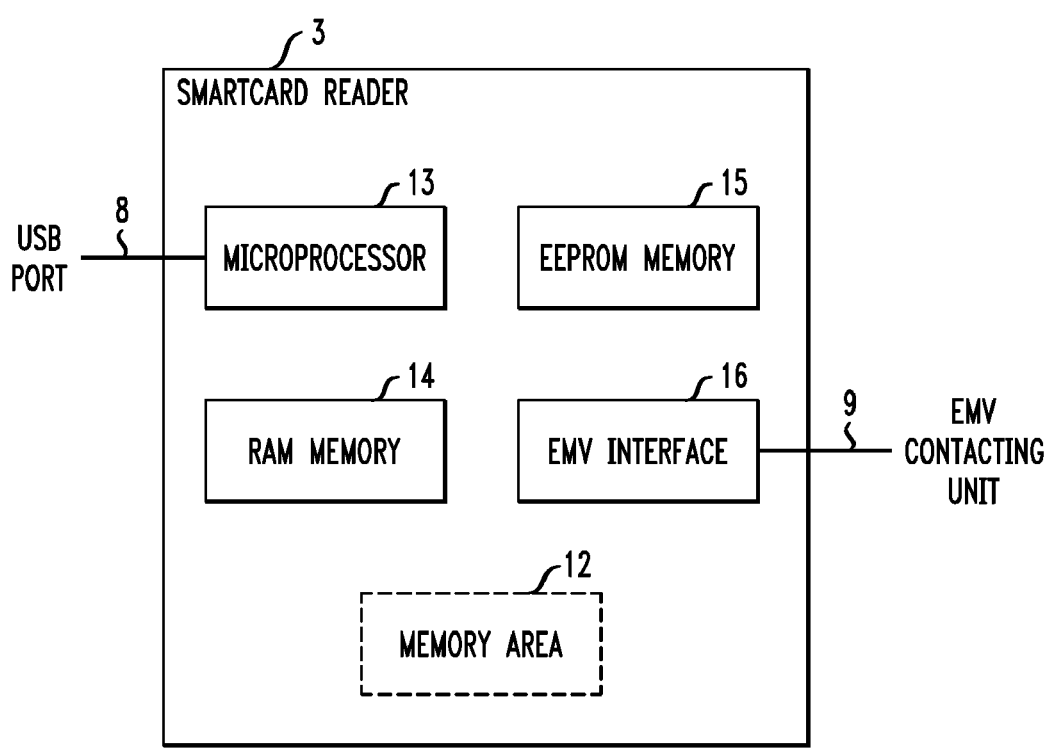
FIG. 1 depicts smartcard reader 3.

Reference is made below to FIGS. 1 and 2.

The invention describes a smartcard reader (3) into which any desired smartcard (2) conforming to the EMV standard can be inserted. The latter is addressed via an EMV contacting unit (9) conforming to the EMV standard.

The smartcard reader (3) is connected via a USB port (8) to a commercial personal computer (PC, 4) and is recognized by the operating system (11) installed there or via a USB driver (6) contained therein.

Thus, there is no necessity for the installation of a specific driver for smartcard reader (3).

In order to make smartcard reader (3) usable, it is addressed by a browser plug-in (7a), which is first downloaded by the locally installed Internet browser (5) from Internet server (1) and installed in Internet browser (5) (7b). Via browser plug-in (7b), USB driver (6), USB port (8) and smartcard reader (3), Internet server (1) can access the smartcard (2) in order to authenticate the owner/user and/or to have transactions signed with a digital signature.

An alternative embodiment of the invention will be described below

Internet browser (5) together with browser plug-in (7b) can be stored, preconfigured in an optionally available memory area (12) of smartcard reader (3), and loaded from there via USB driver (6) and operating system (11) into PC (4) and run therein. In this case, no download from Internet server (1) is necessary in order to perform transactions with smartcard (2).

The invention claimed is:

1. A method for controlling a chip card reader (3) by a computer system (4) connectable to the chip card reader (3), comprising:
   connecting the chip card reader (3) to the computer system (4) via an interface (8), which is designed for data communication on the basis of a standard USB-HID protocol provided in an operating system (11) of the computer system (4);
   providing a control program (7a, 7b) for controlling the functions of the chip card reader (3), wherein the control program (7a, 7b) is provided as a plug-in; and
   controlling the chip card reader (3) by running the control program (7b) on computer system (4), wherein executing the control program (7b) performs at least one of the following tasks: (i) user authentication, (ii) authorization of a transaction, and (iii) data encryption.

2. The method according to claim 1, further comprising:
   providing the control program (7a) on a server (1),
   setting up a communication connection (10) between the server (1) and the computer system (4), and
   transmitting the control program (7a, 7b) from the server (1) to the computer system (4).

3. The method according to claim 2, further comprising:
   calling up the control program (7a, 7b) by the computer system (4) from the server (1); and
   transmitting a control command from the chip card reader (3) to the computer system (4), effecting the calling of control program (7a).

4. The method according to claim 1, further comprising:
providing the control program (7b) in a memory (12) of the chip card reader (3); and
transmitting the control program (7b) from the chip card reader (3) to the computer system (4).

5. The method according to claim 4, wherein the transmission of the control program (7b) from the chip card reader (3) to the computer system (4) is automatically initiated upon connection of the chip card reader (3) to the computer system (4).

6. A chip card reader (3) for connection to a computer system (4), comprising:
a port unit (9) for the connection of a chip card (2); and
an interface (8) for connection to the computer system (4) constructed for data communication on the basis of a USB-HID protocol, wherein the chip card reader (3) is constructed for control by means of a control program (7b) that is provided as a plug-in, wherein executing the control program (7b) performs at least one of the following tasks: (i) user authentication, (ii) authorization of a transaction, and (iii) data encryption.

7. The chip card reader (3) according to claim 6, further comprising a memory (12) in which the control program (7b) is stored.

8. A control program (7b) for running on a computer system (4) for controlling the functions of a chip card reader (3) connectable to the computer system (4) via interface (8), characterized in that the control program (7b) is constructed as a plug-in, whereon executing the control program (7b) performs at least one of the following tasks: (i) user authentication, (ii) authorization of a transaction, and (iii) data encryption, and wherein the interface (8) is designed for data communication on the basis of a standard USB-HID protocol provided in an operating system (11) of the computer system (4).

* * * * *